United States Patent
Kim et al.

(10) Patent No.: US 7,814,565 B2
(45) Date of Patent: Oct. 12, 2010

(54) NANOSTRUCTURE ON A PROBE TIP

(75) Inventors: Yong Hyup Kim, Seoul (KR); Tae June Kang, Seoul (KR)

(73) Assignee: SNU R&DB Foundation, Seoul (KR)

( * ) Notice: Subject to any disclaimer, the term of this patent is extended or adjusted under 35 U.S.C. 154(b) by 189 days.

(21) Appl. No.: 12/199,733

(22) Filed: Aug. 27, 2008

(65) Prior Publication Data

US 2010/0058500 A1 Mar. 4, 2010

(51) Int. Cl.
*G21K 7/00* (2006.01)
*G01B 5/28* (2006.01)
*G01N 21/75* (2006.01)

(52) U.S. Cl. .............................. 850/29; 850/21; 850/32; 850/40; 850/45; 850/48; 850/56; 850/58; 850/60; 250/306

(58) Field of Classification Search ............... 850/21, 850/29, 32, 40, 45, 48, 52, 56, 58, 60
See application file for complete search history.

(56) References Cited

U.S. PATENT DOCUMENTS

| | | | |
|---|---|---|---|
| 6,528,785 B1 * | 3/2003 | Nakayama et al. | 850/58 |
| 6,705,154 B2 * | 3/2004 | Nakayama et al. | 73/105 |
| 6,800,865 B2 * | 10/2004 | Nakayama et al. | 250/492.3 |
| 7,138,627 B1 * | 11/2006 | Nakayama et al. | 250/306 |
| 7,398,678 B2 * | 7/2008 | Nakayama et al. | 73/105 |
| 7,507,958 B2 * | 3/2009 | Choi et al. | 250/306 |
| 7,572,300 B2 * | 8/2009 | Cohen et al. | 850/58 |
| 7,579,764 B2 * | 8/2009 | Wei et al. | 313/311 |
| 7,635,392 B2 * | 12/2009 | Bloess et al. | 850/56 |
| 7,666,791 B2 * | 2/2010 | Mostarshed et al. | 438/695 |
| 7,703,147 B2 * | 4/2010 | Park et al. | 850/60 |
| 2009/0045720 A1 * | 2/2009 | Lee et al. | 313/503 |
| 2009/0098671 A1 * | 4/2009 | Kim et al. | 438/20 |
| 2009/0106869 A1 * | 4/2009 | Park et al. | 850/60 |
| 2009/0205092 A1 * | 8/2009 | Wang et al. | 850/40 |
| 2009/0293162 A1 * | 11/2009 | Cohen et al. | 850/40 |
| 2010/0005553 A1 * | 1/2010 | Jin et al. | 850/58 |
| 2010/0031405 A1 * | 2/2010 | Kley | 850/56 |

OTHER PUBLICATIONS

Dai et al., "Nanotubes as nanoprobes in scanning probe microscopy" Nature, vol. 384, Nov. 14, 1996, pp. 147-150.

Wong et al., "Single-walled carbon nanotube probes for high-resolution nanostructure imaging", Applied Physics Letters vol. 73, Dec. 7, 1998, pp. 3465-3467.

* cited by examiner

*Primary Examiner*—David A Vanore
(74) *Attorney, Agent, or Firm*—Knobbe, Martens, Olsen & Bear, LLP

(57) ABSTRACT

Techniques for forming a nanostructure on a probe tip are provided.

20 Claims, 6 Drawing Sheets

NANOSTRUCTURE ON A PROBE TIP

TECHNICAL FIELD

The described technology relates generally to nanostructures and, more particularly, nanostructures on a probe tip.

BACKGROUND

Recently, considerable research has been conducted on nanostructures including carbon nanotubes (CNTs), nanowires, nanorods, etc. One outcome of such research is the discovery that the CNT can be used as a probe tip of an atomic force microscope (AFM). The probe tip of an AFM should have sufficient strength to resist impact with a specimen surface in operation and should have a high aspect ratio to enhance resolution of the probe tip.

CNTs have good chemical-resistant properties and good mechanical strength and may provide for a high aspect ratio, and thus may be a promising candidate for attachment to the probe tip of an AFM. In order to apply a CNT to a probe tip of an AFM, several techniques have been devised to form a needle-shaped CNT at an apex of a probe tip. For example, one technique for attaching a CNT involves attaching a CNT to a silicon tip coated with an adhesive (see, for example, Appl. Phys. Lett. 73(23) 3465-3467, 1998 by S. S. Wong, et al. or Nature 384(14), 147-150, 1996 by H. Dai, et al.)

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, can be arranged, substituted, combined, and designed in a wide variety of different configurations, all of which are explicitly contemplated and make part of this disclosure.

When an element or layer is referred to herein as being "on" another element or layer, the element or layer may be directly on the other element or layer or one or more intervening elements or layers may be present. Also, as used herein, the term "and/or" may include any and all combinations of one or more of the associated listed items.

In one embodiment, a method for forming a nanostructure on a probe tip includes providing a substrate on which a plurality of nanostructures are formed, contacting a probe tip with at least one of the nanostructures, the probe tip having a surface layer, melting at least a portion of the surface layer to attach the at least one nanostructure to the probe tip, and releasing the at least one nanostructure from the substrate.

Figure 1:
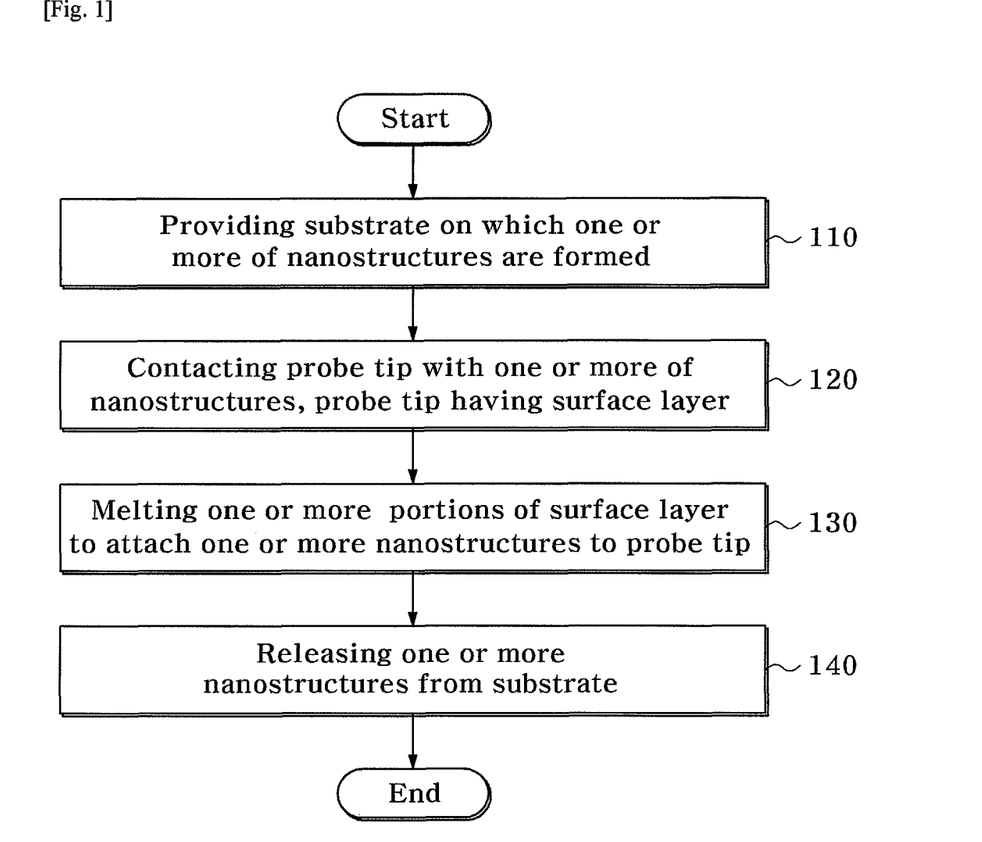
FIG. 1 is a flowchart illustrating a method of forming a nanostructure on a probe tip in one illustrative embodiment.

FIG. 1 is a flowchart illustrating a method of forming a nanostructure on a probe tip in one illustrative embodiment.

At block 110, a substrate on which one or more nanostructures are formed may be provided. In block 120, a probe tip including a surface layer may be brought into contact with one or more of the nanostructures. The surface layer may include a metal having a lower melting point than a melting point of the probe tip. In block 130, at least one portion of the surface layer in contact with the one or more nanostructures may be rendered into a molten state and then re-solidified in order to attach the one or more nanostructures to the probe tip. In block 140, the one or more nanostructures may be released from the substrate.

The method of forming a nanostructure on a probe tip shown in FIG. 1 will now be described in greater detail with reference to FIGS. 2 to 6.

Figure 2:
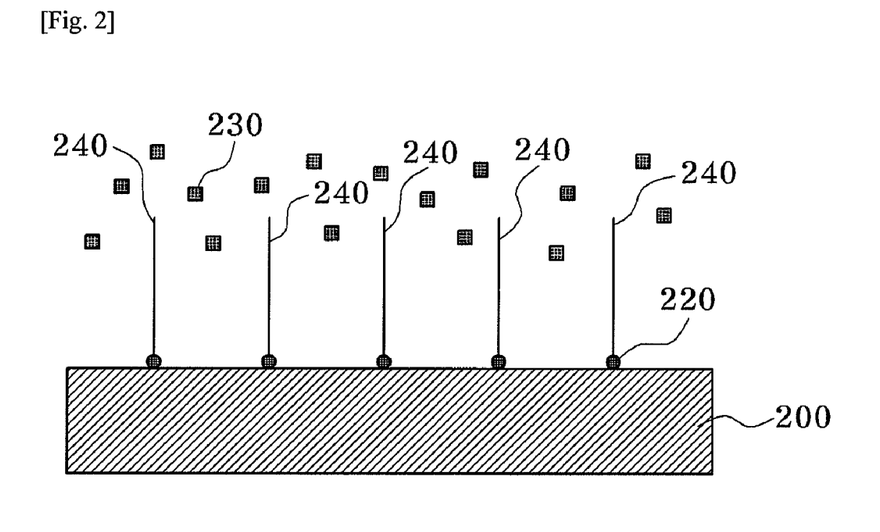
FIGS. 2 to 6 are cross-sectional views schematically illustrating a method of forming a nanostructure on a probe tip in one illustrative embodiment.

Referring to FIG. 2, nanostructures 240 may be formed on a substrate 200. In one embodiment, the substrate 200 may be an electrically conductive substrate. The nanostructures 240 may exhibit electrical conductivity, and may include, for example carbon nanotubes (CNTs), Single-Walled Nanotubes (SWCT), conductive nanowires, etc although claimed subject matter is not limited to specific types or compositions of nanostructures. For the sake of brevity hereinafter techniques of forming CNTs 240 as one illustrative embodiment of the nanostructures 240 will now be described.

In some embodiments, catalyst particles 220 may be formed on the substrate 200, and the CNTs 240 may be formed from the catalyst particles 220. The catalyst particles 220 may, for example, include nickel, cobalt, molybdenum, iron or combinations thereof. Claimed subject matter is not, however, limited to the use of catalyst particles in forming nanostructures nor is claimed subject matter limited to particular types or compositions of catalyst particles.

In one embodiment, the catalyst particles 220 may be dispersed in a solution in the form of nano particles, and the solution including the catalyst particles 220 may be sprayed onto the substrate 200. The solution except the catalyst particles 220 may then be evaporated from the substrate 200.

In another embodiment, the catalyst particles 220 may be formed as an aggregate on the substrate 200. The aggregated catalyst particles 220 may be formed by depositing and patterning a catalyst layer on the substrate 200 followed by annealing of the patterned catalyst layer. For example, a nickel layer as the catalyst layer may be deposited on the substrate 200 by sputtering technique and the nickel layer may be patterned by lithography and etch techniques. The patterned nickel layer is annealed at a temperature of about 700° C., thereby forming aggregated nickel catalyst particles.

In some embodiments, the CNTs 240 may be formed from the catalyst particles 220 by chemical vapor deposition (CVD) technique using a reaction gas 230 containing hydrocarbon. The CVD technique may employ, for example, heat, plasma or microwave as an energy source. The hydrocarbon may include carbon monoxide, acetylene, ethylene, ethane, methane, propane, or any combination thereof. The reaction gas 230 including the hydrocarbon is dissolved on the catalyst particles 220 by, for example, the heat, the plasma or the microwave. Carbon atoms separated from the hydrocarbon in the dissolved reaction gas 230 diffuse into the catalyst particles 220 and the carbon atoms are filled with the catalyst particles 220. When the carbon atoms are filled beyond the solubility of carbon in the catalyst particles 220, precipitation of the carbon atoms occurs. As a result of the precipitation, the carbon atoms are extracted from the catalyst particles 220. Then, the extracted carbon atoms are rearranged on the interface with the catalyst particles 220. The rearranged carbon atoms grow from the interface to form the CNTs 240 on the substrate 200.

In the illustrative embodiment of FIG. 2, the CNTs 240 are formed on the catalyst particles 220 while the catalyst particles 220 are attached to the substrate 200. In other embodiments, the carbon atoms of the dissolved reaction gas 230 may diffuse from the top surface into the bottom surface of the catalyst particles 220 and then be extracted from the bottom surface of the catalyst particles 220. As a result, the CNTs 240 may be formed below the catalyst particles 220. The catalyst particles 220 may remain on the CNTs 240 after the CNTs 240 are formed from the catalyst particles 220.

In one embodiment, an electrode (not shown) may be positioned apart from the substrate 200. For example, the electrode may be disposed over the catalyst particles 220 on the substrate 200. A voltage, such as an external voltage, may be applied between the substrate 200 and the electrode while the CNTs 240 are being formed on the substrate 200. An electric field generated by the voltage may prevent the CNTs 240 from randomly growing on the substrate 200. The electric filed may interact with the CNTs 240 growing on the substrate 200. The electric field may change the internal dipole polarity of the CNTs 240 and generate torque and force to align the CNTs 240. Accordingly, the electric field may change the growth direction of the CNTs 240 on the substrate 200, thus allowing the CNTs 240 to be aligned along the electric filed.

In the illustrative embodiment of FIG. 2, the CNTs 240 as formed may be aligned in a substantially vertical direction with respect to the substrate 200 by adjusting the external voltage. In some embodiments, the CNTs 240 may be sparsely distributed over the substrate 200 by controlling the density of the catalyst particles 220 on the substrate 200.

Techniques of forming other types of the nanostructures other than the CNTs 240 may be substantially the same as the technique of forming the CNTs 240 described above with reference to FIG. 2. That is, a predetermined source gas corresponding to nanostructures may be provided and dissolved on catalyst particles, and the nanostructures may be formed by reactions between the dissolved source gas and the catalyst particles. In one embodiment, silicon carbide nanorods may be formed by a CVD technique using a vaporized $C_6H_{18}Si_2$ gas as the source gas and iron particles as the catalyst particles. In another embodiment, silicon oxide nanowires may be formed by an evaporation technique using a vaporized SiO gas as the source gas and iron particles as the catalyst particles.

Figure 3:
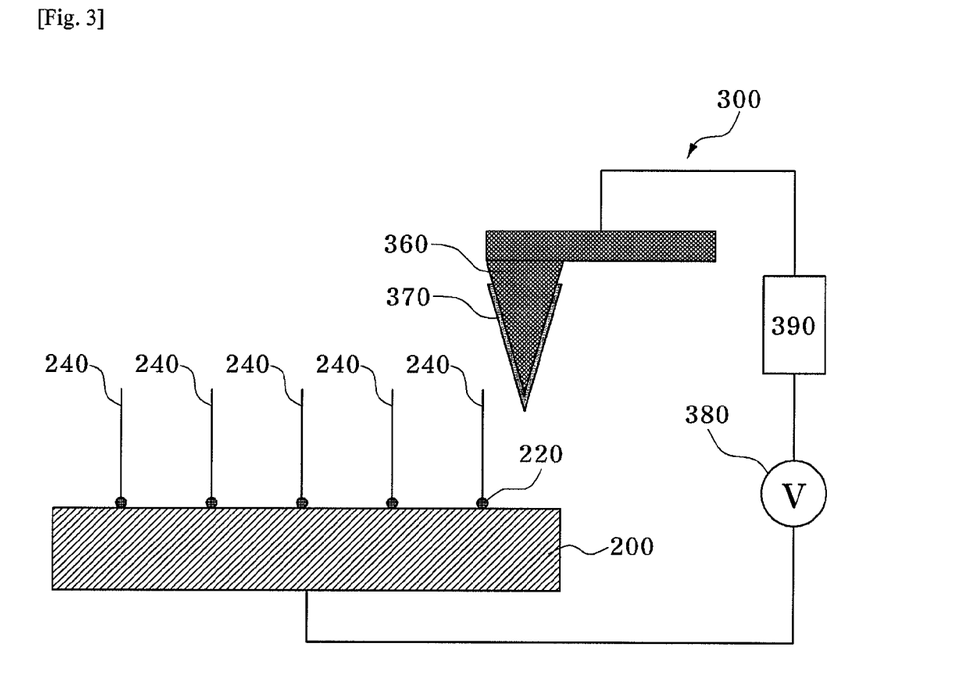

Referring to the illustrative embodiment of FIG. 3, a probe tip 360 including a surface layer 370 may be spaced apart from the substrate 200 bearing the nanostructures 240. The probe tip 360 may, for example, be formed of a metal such as tungsten, nickel, aluminum, molybdenum, tantalum, niobium, or an alloy thereof. The surface layer 370 may include a metal having a melting point lower than that of the probe tip 360. The metal forming the surface layer 370 may include, for example, tin or zinc. In some embodiments, the surface layer 370 may be formed on the probe tip 360 by, for example, sputtering or evaporation techniques.

As shown in FIG. 3, a voltage source 380 may be used to apply a voltage between the substrate 200 and the probe tip 360. The substrate 200 may itself be electrical conductive or may be provided with a conductive via or pad (not shown) formed within or on the substrate 200, and thus the substrate 200 may provide the voltage from the voltage source 380 to the nanostructures 240. Accordingly, an electric circuit 300 including the nanostructures 240, the substrate 200, the voltage source 380 and the probe tip 360 may be formed.

A current measuring device 390 may be disposed on the electric circuit 300. The current measuring device 390 may be used to measure a predetermined current generated in the electric circuit 300 when the probe tip 360 bearing the surface layer 370 contacts any one of the nanostructures 240 to close the electric circuit 300.

In one embodiment, the probe tip 360 including the surface layer 370 may be moved with respect to the substrate 200. While the probe tip 360 moves over the substrate 200, the voltage source 380 may apply a first voltage to the electric circuit 300.

Figure 4:
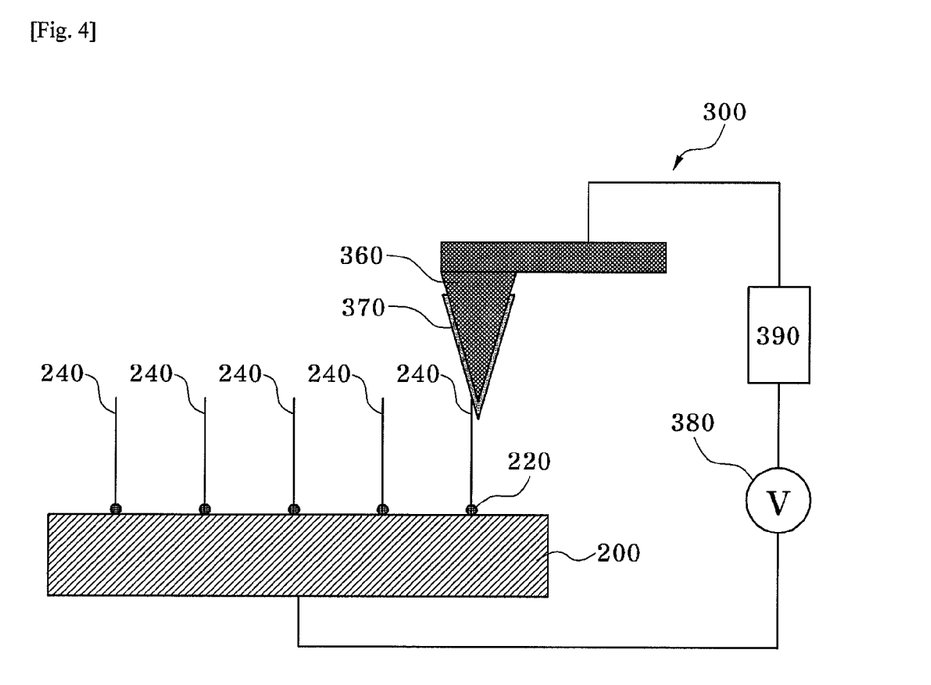

Referring to the illustrative embodiment of FIG. 4, the probe tip 360 bearing the surface layer 370 has been brought in contact with one of the nanostructures 240. When being moved over the substrate 200, the probe tip 360 may stop moving when the probe tip 360 contacts one of the nanostructures 240. Whether the probe tip 360 contacts any of the nanostructures 240 may be determined by measuring a predetermined current generated by the first voltage. For example, when the probe tip 360 does not contact any of the nanostructures 240, the predetermined current may not be measured from the electric circuit 300 by the current measuring device 390. On the other hand, when the probe tip 360 contacts any of the nanostructures 240 to cause the electric circuit 300 to be closed, the predetermined current may be measured by the current measuring device 390. Accordingly, confirmation of whether the probe tip 360 has contacted any one of the nanostructures 240 may be obtained by monitoring the current measuring device 390, and, subsequently, motion of the probe tip 360 can be terminated when contacting with any one of the nanostructures 240 is confirmed.

Figure 5:
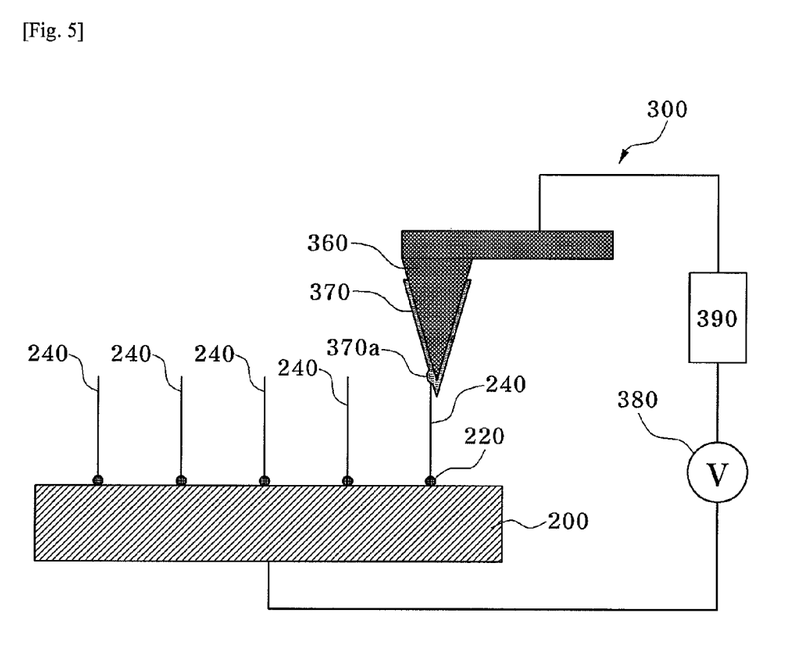

Referring to the illustrative embodiment of FIG. 5, with the probe tip 360 and the surface layer 370 in contact with one of the nanostructures 240, the voltage source 380 may be controlled to apply a second voltage to the electric circuit 300. The second voltage may be substantially the same as the first voltage, or may be a different voltage. With the second voltage applied to the electric circuit 300, resistance heat may be generated by contact resistance at a contact portion 370a of the surface layer 370 between the probe tip 360 and the nanostructure 240. The resistance heat may cause portions of the surface layer 370 contacting the nanostructure 240 to melt, and the molten portions of the surface layer 370 may become bonded to the nanostructure 240 to attach the nanostructure 240 to the probe tip 360. As bonding between molten portions of the surface layer 370 and the nanostructure 240 proceeds, a contact area between the molten portions of the surface layer 370 and the nanostructure 240 may increase. As the contact area increases, contact resistance between the surface layer 370 and the nanostructure 240 may decrease, and, consequently, current measured by the current measuring device 390 may increase. A degree of bonding between the probe tip 360 and the nanostructure 240 may be determined by monitoring the current measured by the current measuring device 390. In one embodiment, by adjusting the magnitude of the second voltage applied to the electric circuit 300, the extent to which the surface layer 370 is molten may be controlled. In this fashion, bonding area and strength between the probe tip 360 and the nanostructures 240 may be adjusted. Since the surface layer 370 is formed of the metal having a low melting temperature described above, melting and re-solidification of the surface layer 370 may be readily achieved by the resistance heat at the contact portion 370a of the surface layer 370.

Figure 6:
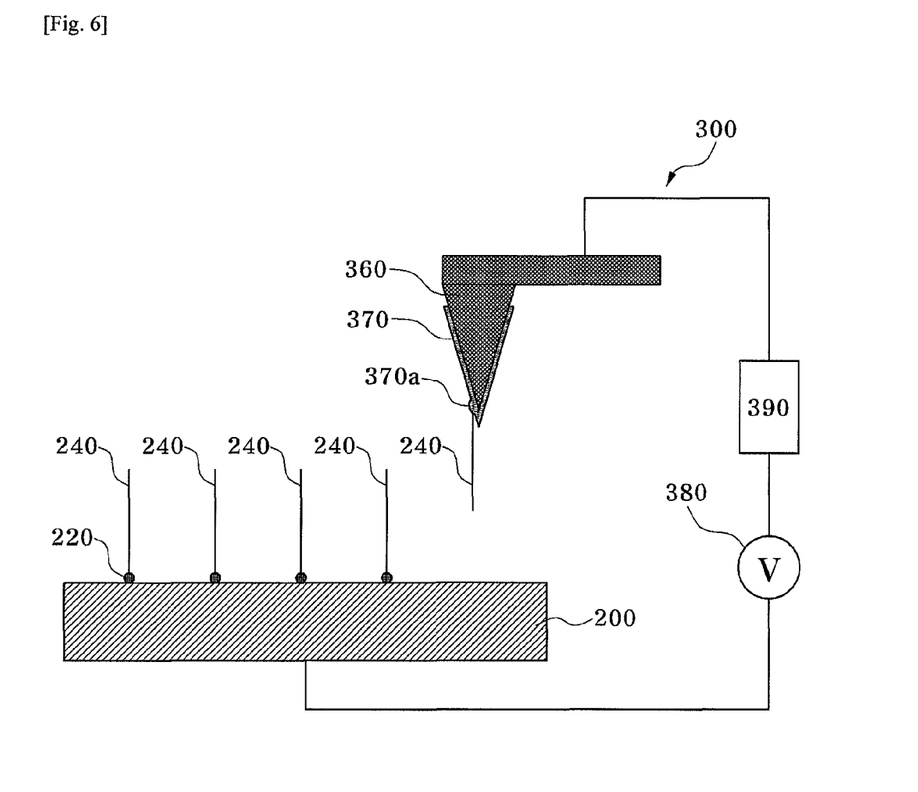

Referring to the illustrative embodiment of FIG. 6, the nanostructure 240 attached to the probe tip 360 may be detached from the substrate 200. In some embodiments, a physical force may be applied to the attached nanostructure 240 to release or detach the attached nanostructure 240 from the substrate 200. Applying a physical force to release the attached nanostructure may be appropriate when a bond between the attached nanostructure 240 and the substrate 200 is relatively weaker than a bond between the attached nanostructure 240 and the probe tip 360. In another embodiment, a voltage and/or current pulse may be applied to the nanostructures 240 to release the attached nanostructure 240 and the probe tip 360.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for forming a nanostructure on a probe tip, comprising:
    providing a substrate on which a plurality of nanostructures are formed;
    contacting a probe tip with at least one of the nanostructures, the probe tip having a surface layer, wherein the probe is metal;
    melting at least a portion of the surface layer to attach the at least one nanostructure to the probe tip; and
    releasing the at least one nanostructure from the substrate.

2. The method of claim 1, wherein the providing of the substrate on which the plurality of nanostructures are formed comprises:
    forming catalyst particles on the substrate; and
    forming the nanostructures from the catalyst particles.

3. The method of claim 2, wherein the forming of the nanostructures from the catalyst particles comprises forming the nanostructures in a substantially vertical direction with respect to the substrate by chemical vapor deposition (CVD) or evaporation techniques in the presence of an electric field.

4. The method of claim 1, wherein the plurality of nanostructures comprise carbon nanotubes or conductive nanowires.

5. The method of claim 1, wherein the probe tip comprises at least one metal selected from the group consisting of tungsten, nickel, aluminum, molybdenum, tantalum and niobium.

6. The method of claim 1, wherein the surface layer comprises a metal having a melting point lower than a melting point of the probe tip.

7. The method of claim 6, wherein the surface layer comprises tin or zinc.

8. The method of claim 1, further comprising forming the surface layer on the probe tip by sputtering or evaporation.

9. The method of claim 1, wherein contacting of the probe tip with at least one of the nanostructures comprises:
    moving the probe tip adjacent the substrate; and
    determining whether the probe tip contacts the at least one of the nanostructures by applying a voltage between the probe tip and the plurality of nanostructures and by monitoring a current generated by contact between the probe tip and the at least one of the nanostructures.

10. The method of claim 1, wherein melting at least a portion of the surface layer to attach the at least one nanostructure to the probe tip comprises:
    applying a voltage between the probe tip and the at least one nanostructure to generate resistance heat between the surface layer and the at least one nanostructure; and
    allowing the resistance heat to melt the at least a portion of the surface layer.

11. The method of claim 10, wherein the resistance heat is generated at a contact portion of the surface layer and the at least one nanostructure.

12. The method of claim 10, further comprising varying the voltage to adjust a bonding strength between the probe tip and the at least one nanostructure.

13. The method of claim 1, wherein releasing the at least one nanostructure from the substrate comprises applying a physical force to the at least one nanostructure.

14. The method of claim 1, wherein releasing the at least one nanostructure from the substrate comprises applying a voltage and/or current pulse to the at least one nano structure.

15. An apparatus comprising:
    a probe tip, wherein the probe tip is metal;
    a surface layer disposed on the probe tip; and
    a nanostructure disposed on the probe tip,
    wherein the nanostructure has been disposed on the probe tip by melting at least a portion of the surface layer adjacent the nanostructure.

16. The apparatus of claim 15, wherein the probe tip comprises at least one metal selected from the group consisting of tungsten, nickel, aluminum, molybdenum, tantalum and niobium.

17. The apparatus of claim 15, wherein the surface layer comprises a metal having a melting point lower than a melting point of the probe tip.

18. The apparatus of claim 17, wherein the surface layer comprises tin or zinc.

19. The apparatus of claim 15, wherein the nanostructure comprises a carbon nanotube or a conductive nanowire.

20. A method for forming a nanostructure on a probe tip, comprising:
    providing a substrate on which a plurality of nanostructures are formed;
    contacting a probe tip with at least one of the nanostructures, the probe tip having a surface layer;
    melting at least a portion of the surface layer to attach the at least one nanostructure to the probe tip, wherein melting at least a portion of the surface layer to attach the at least one nanostructure to the probe tip comprises applying a voltage between the probe tip and the at least one nanostructure until a pre-determined current is obtained; and
    releasing the at least one nanostructure from the substrate.

* * * * *

UNITED STATES PATENT AND TRADEMARK OFFICE
CERTIFICATE OF CORRECTION

| | | |
|---|---|---|
| PATENT NO. | : 7,814,565 B2 | |
| APPLICATION NO. | : 12/199733 | |
| DATED | : October 12, 2010 | |
| INVENTOR(S) | : Kim et al. | |

It is certified that error appears in the above-identified patent and that said Letters Patent is hereby corrected as shown below:

Title Page (Item 56) Column 2, Line 21, under other publications, change "Appliced" to --Applied--.

Title Page (Item 74) Attorney, Agent or Firm, Line 1, change "Olsen" to --Olson--.

Column 5, Line 23, in Claim 1, after "probe" insert --tip--.

Signed and Sealed this
Tenth Day of May, 2011

David J. Kappos
*Director of the United States Patent and Trademark Office*